Patented July 3, 1951

2,559,338

UNITED STATES PATENT OFFICE 2,559,338

LOW METHOXYL ACID PECTINATE JELLY COMPOSITION

William E. Barch, New York, N. Y., assignor to Standard Brands Incorporated, New York, N. Y., a corporation of Delaware No Drawing. Application June 25, 1947, Serial No. 757,055

4 Claims. (Cl. 99—132)

This invention relates to gel-forming compositions comprising low methoxyl acid pectinates and to a process for preparing low methoxyl acid pectinate gels.

Pectin gels only in the presence of such a high concentration of sugar that desserts made with pectin are unpleasantly sweet. Hence, the trend in recent years has been towards the development of pectin derivatives which will form gels in the absence of sugar. Research in the partial deesterification of pectin has led to the development of low methoxyl acid pectinates (commonly referred to as low methoxyl pectins) whose aqueous solutions gel through reaction of the pectinate with a metallic ion such as calcium to form an insoluble salt rather than through the presence of a high concentration of sugar as with ordinary pectin. The characteristics of low methoxyl acid pectinates and their preparation have been fully described in the recent literature; particularly in point are U. S. Patents Nos. 2,133,273 and 2,233,574 to Baker and Goodwin, and the articles by McCready, Owens, and Maclay in Food Industries, vol. 16, pages 794–796; 864–865; 906–908 (1944).

Low methoxyl acid pectinate gel-forming compositions heretofore prepared are of two types. One consists of a simple dry mixture of a calcium salt and a low methoxyl acid pectinate. When such a mixture is added to water the particles tend to clump together and dissolve slowly or incompletely. In consequence gels formed from mixtures of this type have low strength and poor texture because of uneven grain structure. They are cloudy in appearance because of the undissolved particles.

This effect has been found to be a result of local concentration conditions about the dissolving particles. If the particulate low methoxyl acid pectinate dissolves more rapidly than the calcium salt, a local high concentration of pectinate ions surrounds the calcium salt particles. As soon as calcium ions are formed, they react with pectinate ions to form an insoluble membrane of calcium pectinate upon the surface of the calcium salt particles. This membrane completely encloses and prevents further solution of the calcium salt particle. On the other hand, if a local high concentration of calcium ions is created about the pectinate particles the same insoluble membrane is formed upon their surface, preventing their complete solution. This membrane, which in both cases is really a low methoxyl acid pectinate gel, has a melting point above 100° C. and cannot be dispersed in hot water.

In the second type mixture this difficulty is overcome by packaging the calcium salt and the particulate low methoxyl acid pectinate separately. To form the gel the two materials are dissolved separately in water and the solutions then combined. This two-step process has proved to be unpopular with the consumer.

In accordance with this invention, the undesirable concentration effects which occur when both a calcium salt and a particulate low methoxyl acid pectinate are dissolved together or successively in the same solution are avoided by providing a high enough concentration of hydrogen ion localized about each of the calcium salt particles in the solution to prevent formation of an insoluble calcium pectinate membrane thereabout or to dissolve it as it is formed, and by ensuring the solution of at least a substantial quantity of the low methoxyl acid pectinate before any appreciable solution of calcium salt occurs. This is accomplished by dissolving an acid with each calcium salt particle at the same time and place in the gel-forming solution, and by causing the calcium salt to dissolve more slowly than the low methoxyl acid pectinate.

To achieve this, the acid and calcium salt are thoroughly mixed and then the mixture is compacted to give an aggregate mass which is sufficiently coherent to substantially slow down its rate of solution and to hold together while in the solution until it has completely dissolved. This may be accomplished by various methods. In one method, the mixture of acid and calcium salt is compressed in a mold or die, for example at pressures between 1000 and 30,000 lbs. per sq. in. In another method, the acid of the mixture of acid and calcium salt is fused; this may be accomplished by employing an organic acid of sufficiently low melting point. When it has again solidified, the fused acid acts as a matrix for the calcium salt. The acid-calcium salt mixture may also be adhered together with or enclosed in an edible water-soluble binder such as dextrose.

For convenience in use, the compacted mixture may be formed in the shape of pellets or wafers of predetermined size, using molds and the like. The gel-forming composition may contain one or more pellets or wafers, depending upon their size.

The pectinate and wafer may be separately packaged but it is most convenient to package and dissolve them together. When they are separately packaged, either the pectinate must be dissolved first, or they must both be dissolved together.

To produce the gel-forming composition of the invention a portion of the compacted acid-calcium salt mixture is then combined with a low methoxyl acid pectinate. If desired, flavoring and coloring ingredients, and sugar may be added.

The low methoxyl acid pectinates employed in accordance with this invention are characterized by a methoxyl content between about 2.5 and about 6.5% by weight. Below about 2.5% methoxyl the low methoxyl acid pectinate will form a gel only with accompanying precipitation of calcium pectinate particles. Above 6.5% methoxyl the presence of sugar is required before gelation will occur, the molecule at this degree of esterification being very similar to the pectin molecule.

When added to water, dry low methoxyl acid pectinates tend to form lumps which are difficult to dissolve. This may be avoided by thorough dispersal of the dry pectinate powder on sugar particles. Either sucrose or a nonsweetening sugar such as dextrose, maltose or lactose may be used.

Calcium salts which have been employed include calcium malate, calcium citrate, calcium lactate, calcium sulphate, tricalcium phosphate and monocalcium phosphate. Any soluble edible inorganic or organic calcium salt may be employed.

The acid combined therewith should be a solid. Among the suitable acids are citric, malic, tartaric, fumaric and ascorbic. Any soluble edible inorganic or organic acid may be employed.

Preferably, the salt and acid are tasteless and not deliquescent. For the latter reason hydrated forms of the salt or acid are used generally.

The mixture generally used comprises an acid and the calcium salt of that acid. However, where there is no danger of chemical reaction, a mixture of any acid and calcium salt may be used.

The total concentration of calcium ion should be the minimum that will form a clear homogeneous gel of satisfactory strength with the weight of pectinate employed. At too low a concentration of calcium ion, gel formation will be impossible, while too high a concentration of calcium ion results in a precipitate of calcium pectinate. A total concentration of calcium ion of between about 15 and about 25 mg. per gram of pectinate has been found to avoid these difficulties and is preferred, while a total concentration of about 18 mg. per gram of pectinate has been found to be the optimum.

In determining the quantity of calcium ion to be added the amount of calcium already present in the other ingredients of the composition should be taken into account. Most fruit juices, for example, contain small quantities of calcium ion. When they are used the amount of calcium salt added should be correspondingly reduced.

Gel formation at room temperature has been found to occur at acid pH values between 3 and 7. Consequently sufficient acid should be incorporated with the calcium salt to give a gel having a pH within this range. Preferably the gel should have a pH between 3.5 and 4.5.

While the low methoxyl acid pectinate will form a gel without addition of sugar, sugar is generally added in small quantities to improve the flavor of the gel. A mixture of sucrose and dextrose produces gels of better texture than that obtained by use of either sugar alone. A ratio of about 60% sucrose to 40% dextrose has been found to be most satisfactory.

The invention is illustrated by the following examples:

EXAMPLE 1

This example illustrates the preparation of a fruit-flavored gel in a quantity equivalent to one standard size commercial gelatin dessert package.

A. 0.6 g. acid calcium salt pellet:
    0.1 g. calcium citrate hydrate (20 mg. calcium per gram of low methoxyl acid pectinate)
    0.5 g. citric acid hydrate
B. 6.0 low methoxyl acid pectinate-sugar mixture:
    1.0 g. low methoxyl acid pectinate (pH 4.65) of 80 gel strength dispersed on
    5.0 g. sucrose
    15.0 g. granulated sugar
    0.6 g. cerelose containing certified fruit color
    0.4 g. cerelose containing certified fruit flavor A. 50 g. of citric acid hydrate and 10 g. of calcium citrate hydrate were ground to a powder. This mixture was compressed in a steel die at 15,000 lbs. per sq. in. The pressed cake was broken into pellets.

B. The low methoxyl acid pectinate and sucrose were ground together in a ball mill to a uniform fine powder which was then mixed with color- and flavor-containing cerelose and the sugar.

The fruit-flavored gel-forming composition was prepared by thoroughly mixing A and B in the dry state. The dry composition had excellent keeping qualities. To form a gel the composition was added to 100 cc. water, the water was brought to a boil with stirring, and boiling continued until a clear solution was obtained. The gel formed on cooling the liquid to room temperature in molds was rigid, had a smooth soft texture, and a pH of 3.5.

EXAMPLE 2

This example illustrates the preparation of a composition analogous to a "sparkle" type gelatin dessert.

| | Ounces |
|---|---|
| Low methoxyl acid pectinate } Ground together | 0.134 |
| Sucrose } | 0.835 |
| Granulated cane sugar | 0.835 |
| Dextrose | 0.951 |
| Dextrose containing flavor | 0.067 |
| Dextrose containing color | 0.100 |
| Wafer [1] | 0.078 |
| | 3.000 |

[1] The wafer contained 85.33% citric acid hydrate, and 14.67% calcium malate hydrate. It was prepared by grinding the ingredients together to a fine powder and then pressing in a steel die of 1¼ inches inside diameter on a hydraulic press at 15,000 pounds per square inch to give a wafer. The wafer weight specified gives 18 mg. of calcium ion per gram of low methoxyl acid pectinate and a gel pH of 3.5.

Two cups of boiling water were poured on this mixture and stirring continued for two to three minutes until all the ingredients had dissolved. When poured into molds the gel set on cooling to room temperature.

EXAMPLE 3

The following formula illustrates the preparation of a flavorless packaged powder for gelling fruit juices:

A. Dry gel-forming composition

|  | Ounces |
|---|---|
| Low methoxyl acid pectinate } Ground together | { 0.134 |
| Dextrose | 0.788 |
| Wafer [1] | 0.078 |
|  | 1.000 |

[1] Prepared as described in Example 2.

This dry composition has excellent keeping qualities.

Each of the following fruit juices in the amount given have been gelled with one ounce of this composition:

B. Fruit juice 2 cups tomato containing ¼ teaspoon salt
2 cups orange containing ¼ cup sugar
2 cups grapefruit containing ⅜ cup sugar
2 cups tangerine containing ¼ cup sugar
2 cups grape containing ¼ cup sugar
2 cups apple
2 cups pineapple (fresh) containing ¼ cup sugar
2 cups lemon containing ⅜ cup sugar The gels were rigid, set quickly, unmolded with ease, and had a soft creamy texture. The flavors were particularly fine, retaining the fresh uncooked character of the juices. By freezing these gels fruit ices may be obtained. Gels of this type may also be used for salads and pie fillings.

The formula shown gives a package low in bulk. This may be increased if necessary by using lactose or dextrose as a filler.

EXAMPLE 4

This example illustrates the preparation of dry gel-forming compositions containing dehydrated fruit juices:

|  | Ounces |
|---|---|
| Low methoxyl acid pectinate } Ground together | { 0.134 |
| Sucrose | 0.394 |
| Granulated cane sugar | 2.056 |
| Dehydrated orange or grapefruit juice | 2.338 |
| Wafer [1] | 0.078 |
|  | 5.000 |

[1] Prepared as described in Example 2.

The gel was prepared by pouring two cups of boiling water on the composition, stirring about three minutes until the wafer dissolved, pouring into molds and chilling. The gels were similar in flavor and texture to those obtained with liquid fruit juices. To prevent deterioration of the dehydrated juices it is essential that the composition be preserved in a moistureproof package when it is to be kept for a long period.

The dry low methoxyl acid pectinate compositions in accordance with this invention may also be used as uniform gelling agents for vegetable juices, soup, coffee, tea and similar liquids. The composition is quite versatile and will gel any kind of juice over a wide range of pH regardless of sugar concentration. The set of the composition depends upon temperature and is completely reversible without effect on gel strength or keeping qualities.

Having described my invention what I claim as new and desire to secure by Letters Patent is:

1. A gel forming composition comprising particles of a low methoxyl acid pectinate capable of forming clear homogeneous gels with calcium ions and discrete particles comprising an edible water-soluble calcium salt and an edible water-soluble acid, the rate of solution in water of the latter particles being lower than that of the pectinate particles, the amount of the calcium salt being sufficient to gel the pectinate without substantial precipitation of calcium pectinate when the composition is dissolved in water and the amount of acid being sufficient to provide a solution pH between 3 and 7.

2. A composition as claimed in claim 1 wherein the pectinate has a methoxyl content between about 2.5% and about 6.5%.

3. A composition as claimed in claim 1 wherein the calcium salt is calcium citrate and the acid is citric acid.

4. A composition as claimed in claim 1 wherein the discrete particles comprising calcium salt and acid are in the form of a pellet.

WILLIAM E. BARCH.

REFERENCES CITED

The following references are of record in the file of this patent:

UNITED STATES PATENTS

| Number | Name | Date |
|---|---|---|
| 1,997,615 | Wallerstein | Apr. 16, 1935 |
| 2,063,143 | Baier | Dec. 8, 1936 |
| 2,334,281 | Olsen | Nov. 16, 1943 |